United States Patent
Neumüller et al.

(10) Patent No.: US 6,795,282 B2
(45) Date of Patent: Sep. 21, 2004

(54) SUPERCONDUCTING DEVICE WITH INDUCTIVE CURRENT LIMITER USING A HIGH-TC SUPERCONDUCTING MATERIAL

(75) Inventors: Heinz-Werner Neumüller, Uttenreuth (DE); Günter Ries, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 57 days.

(21) Appl. No.: 10/333,462

(22) PCT Filed: Jul. 9, 2001

(86) PCT No.: PCT/DE01/02550
§ 371 (c)(1),
(2), (4) Date: Jan. 21, 2003

(87) PCT Pub. No.: WO02/09129
PCT Pub. Date: Jan. 31, 2002

(65) Prior Publication Data
US 2003/0191028 A1 Oct. 9, 2003

(30) Foreign Application Priority Data
Jul. 21, 2000 (DE) .......................... 100 35 634

(51) Int. Cl.[7] .............................. H02H 7/00; H02H 9/00
(52) U.S. Cl. .................................. 361/19; 336/DIG. 1
(58) Field of Search ............................ 361/18; 335/216; 62/606, 51.2, 600; 505/892, 888, 894; 336/DIG. 1

(56) References Cited

U.S. PATENT DOCUMENTS

| | | | |
|---|---|---|---|
| 5,334,964 A | | 8/1994 | Voigt et al. |
| 5,930,095 A | | 7/1999 | Joo et al. |
| 6,292,080 B1 | | 9/2001 | Cottevieille et al. |
| 6,411,479 B1 | * | 6/2002 | Zueger et al. ................. 361/19 |
| 6,420,955 B2 | * | 7/2002 | Heismann et al. ............. 338/13 |
| 6,433,660 B1 | * | 8/2002 | Saravolac .................... 335/216 |

FOREIGN PATENT DOCUMENTS

| | | |
|---|---|---|
| DE | 3829207 A1 | 3/1990 |
| DE | 198 51 047 C2 | 9/2001 |
| EP | 0 353 449 A1 | 2/1990 |
| EP | 0 984 462 A2 | 3/2000 |
| WO | WO 00/16350 | 3/2000 |

* cited by examiner

*Primary Examiner*—Anh Mai
(74) *Attorney, Agent, or Firm*—Staas & Halsey LLP

(57) ABSTRACT

A superconducting device comprises an inductive current limiter with an annular element produced from high-Tc superconducting material. The device is further provided with a soft-magnetic yoke leg enclosed by the material and with a transformer with primary and secondary windings and a soft-magnetic flux element with a plurality of yoke legs. The magnetic flux element is designed to contain between the primary winding and the secondary winding of the transformer the yoke leg of the current limiter, the conductor of one winding producing a switch current for the current limiter.

26 Claims, 2 Drawing Sheets

SUPERCONDUCTING DEVICE WITH INDUCTIVE CURRENT LIMITER USING A HIGH-TC SUPERCONDUCTING MATERIAL

CROSS REFERENCE TO RELATED APPLICATIONS

This application is based on and hereby claims priority to PCT Application No. PCT/DE01/02550 filed on 9 Jul. 2001 and German Application No. 100 35 634.6 filed on 21 Jul. 2000, the contents of which are hereby incorporated by reference.

BACKGROUND OF THE INVENTION

The invention relates to a superconducting device having at least one inductive current limiter unit, which contains at least one conductor track which carries a switching current in a limiting situation, at least one annular body which is inductively associated with the conductor track and is composed of high-$T_c$ superconductor material, and a core limb which is surrounded by the annular body and is composed of soft-magnetic material. A corresponding superconducting device is disclosed in EP 0 353 449 A1. Its at least one current limiter unit may have an associated transformer, which has a primary and a secondary coil winding as well as an associated magnetic flux body composed of soft-magnetic material and having a plurality of yoke limbs.

Short circuits and electrical flashovers cannot be reliably avoided in electrical AC supply networks. In the process, the alternating current in the circuit that is affected arises very quickly, that is to say within the first half-cycle, to a multiple of its rated value, until it is interrupted by suitable protection and/or switching units. As a consequence of this, considerable thermal and mechanical stresses occur as a result of current forces in all the affected network components, such as cables, busbars, switches and transformers. Since these short-term loads increase with the square of the current, safe limiting of the short-circuit current to a lower peak value can considerably reduce the requirements for the load capacity of the network components. This results in cost advantages, for example for the construction of new networks and when upgrading existing networks, in that the installation of current limiter units makes it possible to avoid the need to replace network components by embodiments having a higher load capacity.

The use of superconducting current limiter units makes it possible, in a manner known per se, to limit the current rise after a short circuit to a value equivalent to a few multiples of the rated current. Furthermore, a limiter unit such as this is ready for operation once again a short time after the disconnection process. It thus acts as a rapid, self-healing protection device. In the process, it ensures high operational reliability since it acts passively, that is to say autonomously without previous detection of short circuits and without active tripping by a switching signal.

Superconducting current limiter units normally form a switching element which can be inserted into a circuit, in series. Appropriate current limiter units may be of the so-called resistive or inductive type. Inductive current limiter units are normally in the form of induction coils (see, for example DE 38 29 207 A1 or EP 0 440 664 B1). In this type, a shield current is induced by a conductor track (which carries the rated current during operation) of an induction coil winding in an associated (secondary) superconducting winding, which is short-circuited. This superconducting winding may also be formed by a superconducting core or by the part of such a core in the interior of the induction coil.

In the event of a short circuit, the shield current which is induced by a corresponding switching current in the superconducting winding or core becomes so great that the critical (shield) current of the superconducting material is exceeded. In consequence, the current-carrying capacity of this winding or of the core collapses as the superconducting material becomes normally conductive, as a result of which the inductance of the induction coil increases suddenly, with the impedance in the conductor track of the induction coil being raised in a corresponding manner to a value which produces the current-limiting effect. A corresponding inductive current limiter unit is disclosed in the initially cited EP-A document. This contains an induction coil through which the rated current flows and which surrounds an annular body composed of high-$T_c$ superconductor material. This annular body has a centrally symmetrical shape, with a hollow interior, in which a core limb composed of soft-magnetic material of high permeability is arranged concentrically. This core limb may in this case also be part of a complete, intrinsically closed, magnetic circuit.

Known current limiter units such as these with metal-oxide high-$T_c$ materials (so-called "HTS" materials) whose critical temperature $T_c$ is sufficiently high that they can be maintained in the superconducting operating state by liquid nitrogen ($LN_2$) and at most 77 K exhibit a rapid increase in the electrical resistance when their critical values are exceeded. The heating which is associated with this in the normally conductive state, and hence the indirect initiation of the current limiting process in this case take place in a sufficiently short time so that the peak value of a short-circuit current can be limited to a fraction of the unlimited current, for example to 3 to 10 times the value of the rated current. The superconducting parts should in this case make a good thermally conductive contact with a suitable coolant, which allows them to be returned to the superconducting operating state once again within a relatively short time after the critical values have been exceeded.

If a corresponding current limiter unit is now intended to be used to limit the current in the circuit of one of the coil windings in the transformer, whose at least one conductor surrounds a yoke limb of a magnetic flux body composed of soft-magnetic material, then, according to the related art, this is achieved by connecting appropriate separate components in series in the circuit. The design complexity relating to this is correspondingly high.

One potential object of the present invention is therefore to specify a superconducting device having the features mentioned initially, but whose design complexity is reduced.

SUMMARY OF THE INVENTION

In consequence, the superconducting device according to one aspect of the invention has at least one inductive current limiter unit which contains at least one conductor track which carries a switching current in a limiting situation, at least one annular body which is inductively associated with the conductor track and is composed of high-$T_c$ superconductor material, and a core limb which is surrounded by the annular body and is composed of soft-magnetic material. The device furthermore has a transformer which has a primary and a secondary coil winding as well as an associated magnetic flux body composed of soft-magnetic material and having a plurality of yoke limbs. In this case, between the primary coil winding and the secondary coil winding, the magnetic flux body is intended to be provided with at least one further yoke limb which is provided as the core limb of the current limiter unit and, together with the at least one conductor of one of the coil windings, is intended to form the at least one conductor track of the current limiter unit.

In this context, the expression "annular body" means any structure comprising at least one element, component or conductor which contains at least high-$T_c$ superconductor material and forms a short-circuited ring which surrounds the associated yoke limb (which acts as a magnetic bypass element) of the magnetic flux body.

The advantages associated with the refinement of the semiconductor device according to one aspect of the invention are in particular that the magnetic return path of the inductive current limiter unit is integrated, as a further yoke limb, in the magnetic flux body which needs to be provided in any case for the transformer coil windings. The amount of soft-magnetic material is thus correspondingly reduced. Furthermore, the current limiter unit no longer requires its own conductor track to produce a switching current, since the switching current is now produced by the at least one conductor of one of the coil windings themselves; that is to say the function of the high-$T_c$ superconductor material of the annular body to initiate switching is provided solely by the conductor of this coil winding.

For example, the conductors of the transformer coil windings may particularly advantageously likewise contain high-$T_c$ superconductor material. In this case, in particular, the coil windings and the current limiter unit may be arranged in a common cryostat vessel which contains two coolant areas in which, respectively, the winding and the current limiter unit are accommodated. This has the advantage that different temperature levels may be set in the coolant areas.

It is particularly advantageous for the coolant in the coolant area of the transformer coil windings to be at a lower temperature level than the coolant in the coolant area for the limiter unit. In this case, the coolant area for these coil windings and the coolant area for the limiter unit should preferably be at least approximately at the same pressure (including discrepancies of a maximum of ±10% between the pressure in the coolant area for the limiter unit and the pressure in the coolant area for the windings). This is because this makes it possible to dissipate by convection the heat losses produced in the windings by virtue of the alternating current losses in the superconductor without this leading to undesirable gas formation resulting from corresponding vaporization. This makes it possible to avoid the electrical withstand voltage, which is a particular requirement for operation at high voltage, being reduced by gas bubbles.

The superconducting device may also advantageously have a current limiter unit which has a plurality of yoke limbs, which are surrounded by superconducting annular bodies, of a magnetic flux body. This provides a correspondingly high level of design freedom with regard to the cross section of the soft-magnetic material.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
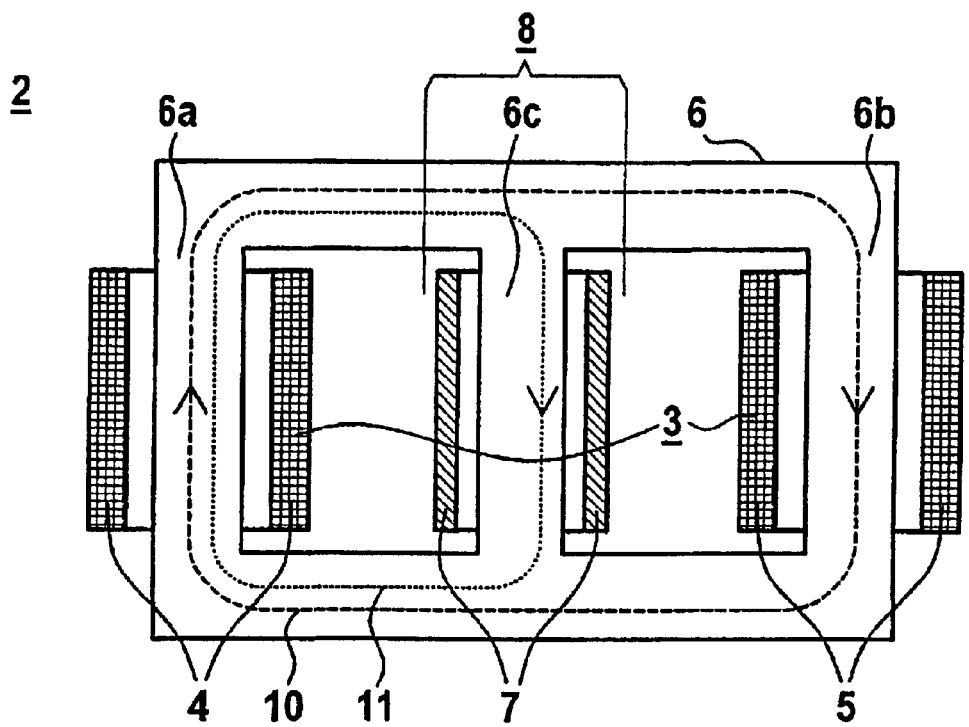
FIG. 1 shows the major parts of a superconducting device with a transformer and a superconducting current limiter unit in the form of a longitudinal section.

Reference will now be made in detail to the preferred embodiments of the present invention, examples of which are illustrated in the accompanying drawings, wherein like reference numerals refer to like elements throughout.

Corresponding parts are in each case provided with the same reference symbols in the figures. The magnetic coil windings of the superconducting device according to one aspect of the invention comprise the primary winding and the secondary winding of a transformer using preferably superconducting conductors (see, for example, WO 00/16350 A). The conductors of the transformer coil windings, which if necessary are subdivided into a plurality of winding elements, do not, however, necessarily need to be composed of superconducting material, in particular high-$T_c$ superconducting material. Normally conductive material is also suitable as the conductor material. The circuit comprising at least one of the transformer coil windings, preferably the primary winding, is intended to have at least one associated inductive current limiter unit. A plurality of current limiter units may, of course, also be provided. Current limiter units which are suitable for the superconducting device are based on known embodiments and their method of operation (see, for example, DE 39 19 465 A1 or EP 0 353 449 A1).

Oxidic HTS cuprat materials such as $YBa_2Cu_3O_x$, $Bi_2Sr_2CaCu_2O_y$ or $(Bi,Pb)_2Sr_2Ca_2Cu_3O_z$ may be used, in particular, as the conductor material for the superconducting parts of the current limiter unit and, if required, of the coil winding. By way of example, $(Bi,Pb)_2Sr_2Ca_2Cu_3O_z$ material may be chosen for the conductor of any HTS coil winding. The specific choice of the material in this case depends on the production processes for the individual parts, and is chosen as a function of the respective operating temperature.

FIG. 1 shows a first embodiment of the superconducting device. This device, which is denoted in general by 2, contains in particular an HTS transformer 3 (which is, for example, superconducting) with a primary transformer coil winding 4 and a secondary transformer coil winding 5. These coil windings respectively surround a first and a second yoke limb 6a or 6b of a three-limb magnetic flux body 6 (or magnetic core) composed of soft-magnetic material as is known, for example, from transformer construction. Between the primary coil winding and the secondary coil winding, the magnetic flux body is intended to be provided with at least one further yoke limb, which may be regarded as a yoke limb that is associated with a current limiter unit. In the illustrated embodiment, between its two outer yoke limbs 6a and 6b, the magnetic flux body 6 accordingly has a middle or central yoke limb 6c as a third (further) yoke limb. This yoke limb 6c is surrounded in a known manner by an annular body 7 which is composed of HTS material and is in the form of a corresponding hollow cylinder. Together with the annular body 7, this forms the major part of a current limiter unit 8. In contrast to the inductive current limiter unit which is disclosed in the cited EP 0 353 449 A1, this current limiter unit has its own conductor track which carries a switching current, in particular a short-circuit current, in a limiting situation. In fact, this conductor track is formed by the primary winding 4 of the transformer 3. This winding, which is formed by at least one conductor that is designed for a rated current, produces a magnetic alternating flux in the magnetic flux body 6 during undisturbed operation, in a closed magnetic flux circuit in which the two yoke limbs 6a and 6b are located, which are respectively associated with the primary winding 4 and the secondary winding 5. This magnetic flux which exists between the primary winding and the secondary winding via the yoke limbs 6a and 6b during normal operation is indicated in the figure by a dashed, arrowed line 10. A ring current or shield current is in this case induced in the superconducting annular body 7, making it impossible for magnetic flux to flow through the yoke limb 6c which is surrounded by it.

In a limiting situation (short-circuit situation or switching situation), the current which is induced in the annular body exceeds the critical value of the HTS material, so that it becomes normally conductive (so-called "quench"). This means that magnetic flux can now pass through the yoke limb 6c. The magnetic flux which is caused by the primary winding 4 and passes through the associated yoke limb 6a can now be closed via the yoke limb 6c before reaching the area of the yoke limb 6b which is associated with the secondary winding 5. This limb 6c thus effectively forms a magnetic bypass with respect to the secondary winding 5 for the magnetic flux which is produced by the primary winding 4. The magnetic flux in this bypass is indicated by a dashed, arrowed line 11 in the figure. Thus, when the magnetic bypass is activated, there is virtually no nett flux through the secondary winding; this is to say the secondary voltage has then returned to a minimal residual value. The current limiter unit 8 is thus operating as a limiter.

Figure 2:
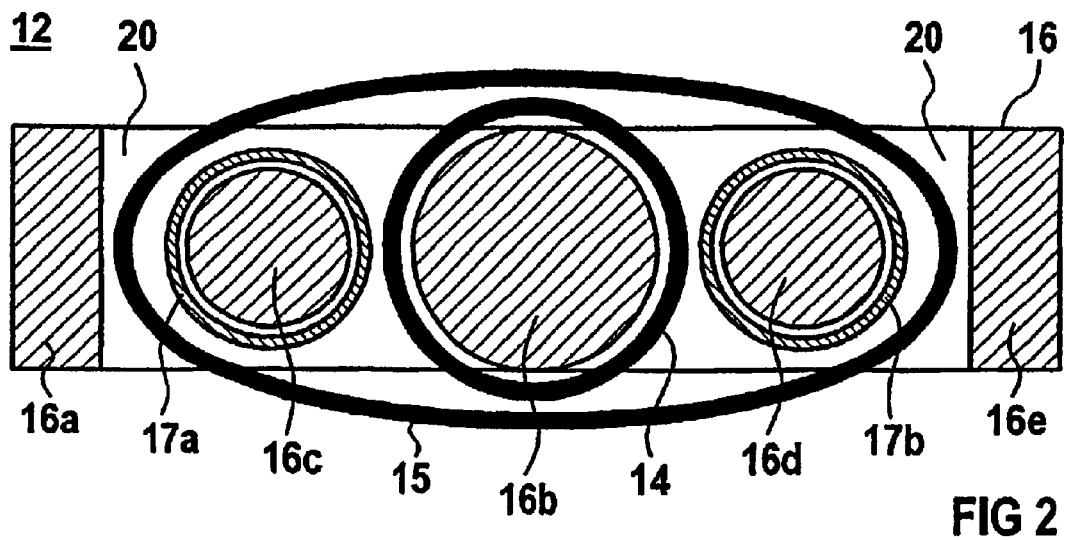
FIG. 2 shows parts of a further superconducting device with a transformer and a different current limiter unit, in the form of a cross section.

The superconducting device is not, of course, restricted to a soft-magnetic magnetic flux body or yoke core which has only a single additional yoke limb as the magnetic bypass element with an HTS annular body. FIG. 2 shows an embodiment with two such bypass elements. The superconducting device, which is annotated generally by 12, accordingly contains a magnetic flux body 16 with two additional yoke limbs 16c and 16d, which act as magnetic bypass elements and are each surrounded by a respective hollow-cylindrical annular body 17a or 17b composed of HTS material. In the illustrated embodiment of the metal flux body 16, the primary winding 14 of a transformer is arranged around a central yoke limb 16b. The secondary winding 15 of this transformer then surrounds not only the primary winding 14 but also the two yoke limbs 16c and 16d, which are arranged at the side of it, with their respective HTS annular bodies 17a and 17b. Furthermore, the figure also shows the two outer side paths 16a and 16e of the magnetic flux body 16.

For the embodiment of a transformer, as shown in FIG. 2, with surrounding primary and secondary windings, it is, of course, also possible, instead of the illustrated two bypass elements 16c and 16d, to arrange only a single such element or else an even greater number of such elements in the stray-flux gap 20 formed between the central yoke limb 16b and the two outer yoke limbs 16a and 16e. The sum of the cross sections of soft-magnetic material must in this case be able to carry the entire primary flux, that is to say it must be of approximately the same size as the transformer core itself.

The primary and/or secondary winding of a transformer are/is advantageously manufactured from superconducting conductors, in particular for HTS conductors. If HTS material is used for the conductors, the material of the HTS annular body 7, 17a, 17b does not necessarily need to be identical to that for the conductors of the at least one winding. All the superconducting parts are expediently accommodated in a common cryostat vessel, with discrete coolant areas being provided, if required, for the at least one annular body and for the at least one coil winding. This has the advantage that it is possible to set different temperature levels in the coolant areas, but in particular with them being at the same pressure. In this case, it may be expedient for the coolant areas to have a connection between them for the coolant. This is because this advantageously allows coolant to be exchanged between the two coolant areas, which may be at different temperature levels.

Figure 3:
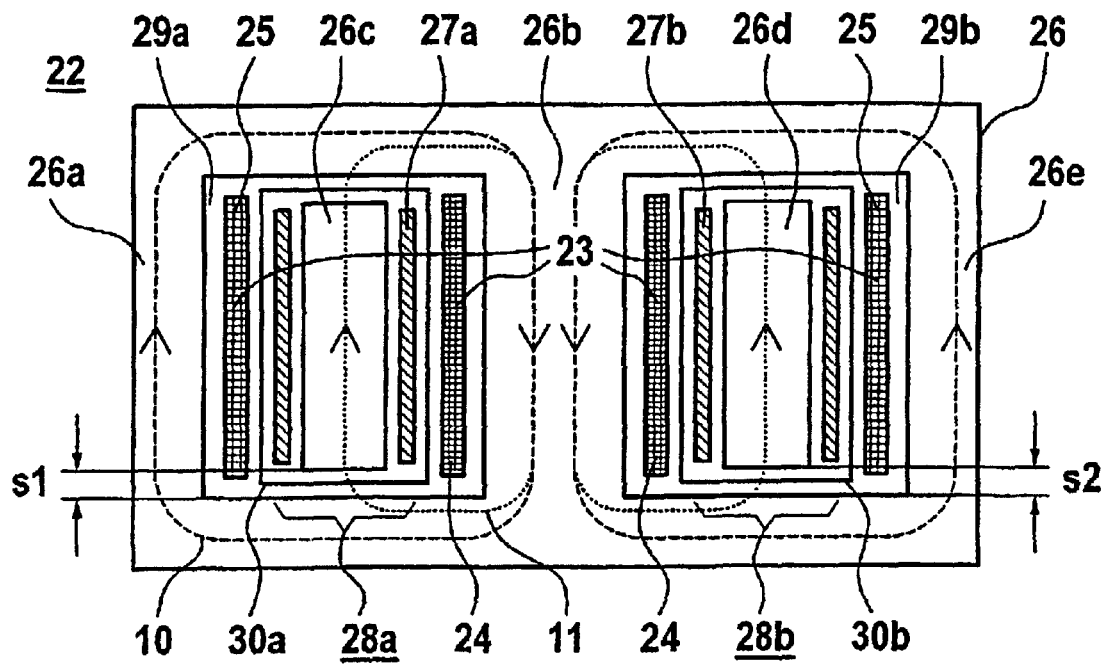
FIG. 3 shows parts of a different superconducting device with a hot transformer and a superconducting current limiter unit in the form of a longitudinal section.

In addition to use of superconducting, in particular HTS, material for the at least one coil winding of a superconducting device, it is also possible to provide a normally conductive, cooled or non-cooled conductor material for the winding. FIG. 3 shows a corresponding exemplary embodiment of a superconducting device 22 with a transformer 23 which contains a primary winding 24 and a secondary winding 25 composed of normally conductive, non-cooled conductors. One magnetic flux body 26 which is used has a central yoke limb 26b and two outer yoke limbs 26a and 26e. A further yoke limb 26c or 26d, respectively, is located as a magnetic bypass element in the respective intermediate spaces 28a and 29b between the central yoke limb 26b and the two respective outer yoke limbs 26a and 26e. These elements are respectively surrounded by a hollow-cylindrical HTS annular body 27a or 27b, and form respective current limiter units 28a and 28b. The HTS annular bodies are located together with their associated yoke limbs 26c and 26d in their own respective cryostat 30a or 30b. This makes it necessary to provide a narrow gap s1 or s2, respectively, between the end faces of the respective yoke bodies 26c and 26d, which are located in the cryostats 30a and 30b, and the respectively adjacent non-cooled parts of the magnetic flux body 26. However, this gap has no adverse effect on the magnetic bypass function of the yoke limbs 26c and 26d. The cryostat walls must therefore be composed of a nonmagnetic, electrically poorly conductive material such as stainless steel in order that no turns voltages can be induced in them during normal operation.

A cross section through the illustrated structure of the superconducting device 22 as shown in FIG. 3 has an appearance corresponding approximately to that in FIG. 2. Furthermore, in a corresponding way to FIG. 1, the magnetic lines of force 10 and 11 are shown in FIG. 3.

Further refinement options for the limiter unit for a superconducting device are: use of an HTS annular body in the form of a hollow cylinder composed of solid HTS material or of a supporting tube composed of nonmagnetic materials such as ceramic, glass or metal, which is coated with the HTS material as a thin film or thick film.

Figure 4:
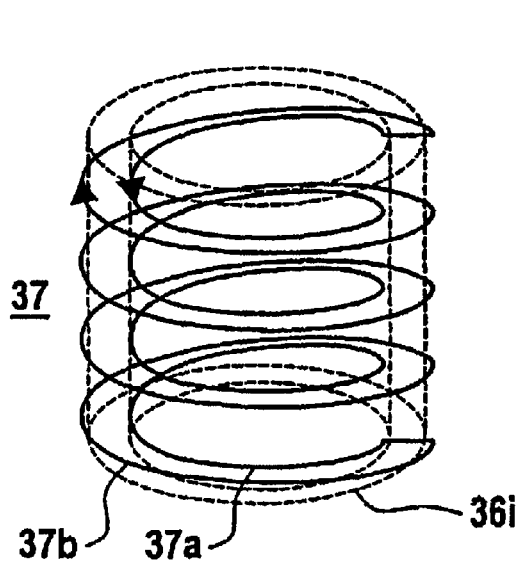
FIGS. 4 and 5 show two refinement options for the superconducting annular body of a current limiter unit, which is suitable for a superconducting device, in the form of a cross section and an oblique view, respectively.

Use of an HTS annular body in the form of a short-circuited winding, composed, for example, of (Bi,Pb)$_2$Sr$_2$Ca$_2$Cu$_3$O$_z$-HTS conductor material in a silver alloy matrix with a high resistivity of, in particular, $\rho \geq 2 \, \mu\Omega\text{cm}$. FIG. 4 shows a perspective view of a corresponding exemplary embodiment. A hollow-cylindrical yoke limb 36i which acts as a magnetic bypass element and is composed of soft-magnetic material is wound with two superconducting windings 37a and 37b with the same number of turns on the inside and outside. These windings form an HTS annular body 27 since they are connected to one another such that the currents which flow through them are in opposite directions. In this embodiment, the primary winding is located with one yoke limb of a magnetic flux body within the magnetic bypass element or yoke limb 36i, while a secondary winding is arranged around this limb. The main flux of the transformer does not induce any current, only stray flux is shielded. In the event of a short circuit, the superconducting material changes to the normally conductive state, with the magnetic flux being closed via the yoke limb 36 as a magnetic bypass. This results in a superconducting device structure similar to that shown in FIGS. 2 and 3.

Use of an HTS annular body in the form of a short-circuited winding composed of an HTS ribbon conductor, which has a film composed of HTS material, such as $YBa_2Cu_3O_x$, on a carrier material in the form of a strip and composed, for example, of stainless steel or of a nickel alloy (for example of "Hastelloy"). The short-circuited winding may, for example, be in the form shown in FIG. 4.

Figure 5:
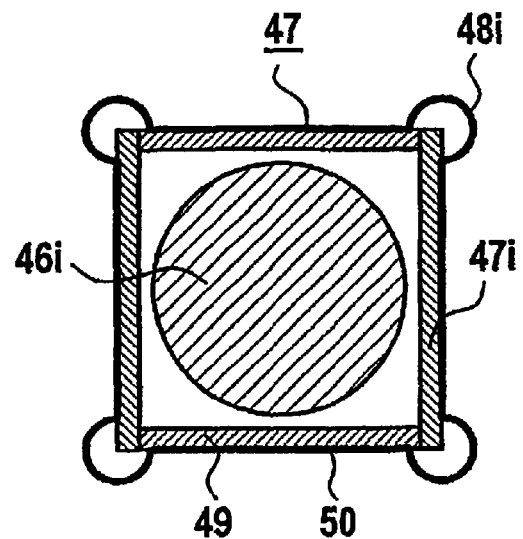

Use of an HTS body which is composed of individual HTS elements. FIG. 5 shows a cross section of a corresponding exemplary embodiment. The HTS annular body, which is annotated 47, surrounds a yoke body 46i which acts as a magnetic bypass element. This is composed of individual plate elements 47i, which are electrically conductively connected to one another at their edges via electrical connecting elements 48i in order to form a short-circuited ring. The plate elements 47i in this case have, for example, a corresponding supporting element 49 composed of an insulating material such as ceramic or glass, on which an HTS layer 50, which is represented by a bold line in the figure and is composed, for example, of $YBa_2Cu_3O_x$, is applied. The figure shows four such HTS plate elements 47i interconnected to form the short-circuited ring; it is also possible, of course, to provide a different number of corresponding elements.

The invention has been described in detail with particular reference to preferred embodiments thereof and examples, but it will be understood that variations and modifications can be effected within the spirit and scope of the invention.

What is claimed is:

1. A superconducting device, comprising:
   at least one inductive current limiter unit, comprising:
      a conductor track which carries a switching current in a limiting situation, track and is formed of high-$T_c$ superconductor material, and
      a core limb which is surrounded by the annular body and is formed of soft-magnetic material; and
   a transformer comprising:
      a primary coil winding of a conductor;
      a secondary coil winding of a conductor, the conductor track being formed from the conductor of at least one of the primary and secondary coil windings; and
      a magnetic flux body composed of soft-magnetic material and having at least first, second and third yoke limbs, the first and second yoke limbs being associated respectively with the primary and secondary coil windings, the third yoke limb being provided between the primary coil winding and the secondary coil winding of the transformer, the third yoke limb serving as the yoke limb for the current limiter unit.

2. The device as claimed in claim 1, wherein the conductors of the coil windings are composed of normally conductive material.

3. The device as claimed in claim 1, wherein
   the annular body of the current limiter unit is arranged with the third yoke limb, and
   the annular body and the third yoke limb are arranged together in their own cryostat.

4. The device as claimed in claim 1, wherein
   there are a plurality of annular bodies, each of which is superconducting, and
   the magnetic flux body has a plurality of yoke limbs, which are surrounded respectively by the plurality of annular bodies.

5. The device as claimed in claim 1, wherein the at least one annular body is composed of solid high-$T_c$ superconductor material.

6. The device as claimed in claim 1, wherein the at least one annular body comprises a supporting tube which is coated with the high-$T_c$ superconductor material.

7. The device as claimed in claim 1, wherein the at least one annular body is formed by a short-circuited winding composed of plate elements which are coated with high-$T_c$ superconductor material.

8. The device as claimed in claim 1, wherein the at least one annular body is formed by a short-circuited winding comprising at least one high-$T_c$ superconductor.

9. The device as claimed in claim 8, wherein the conductor of the short-circuited winding contains high-$T_c$ superconductor material which is embedded in an alloy matrix or is applied to a carrier in the form of a strip.

10. The device as claimed in claim 8, wherein the short-circuited winding is formed from two concentric bifilar-connected winding elements, which are arranged respectively on the inside and outside of a hollow-cylindrical yoke limb of a magnetic flux body.

11. The device as claimed in claim 1, wherein the conductors of the coil windings contain high-$T_c$ superconductor material.

12. The device as claimed in claim 11, wherein the coil windings and the current limiter unit are arranged in a common cryostat vessel.

13. The device as claimed in claim 12, wherein the cryostat vessel contains two coolant areas respectively accommodating the coil windings and the current limiter unit.

14. The device as claimed in claim 13, wherein the coolant in the coolant area for the coil windings is at a lower temperature than the coolant in the coolant area for the current limiter unit.

15. The device as claimed in claim 13, wherein the coolant area for the coil windings and the coolant area for the current limiter unit are at approximately the same pressure.

16. The device as claimed in claim 13, wherein the coolant areas have a connection between them for the coolant.

17. The device as claimed in claim 16, wherein the coolant in the coolant area for the coil windings is at a lower temperature than the coolant in the coolant area for the current limiter unit.

18. The device as claimed in claim 17, wherein the coolant area for the coil windings and the coolant area for the current limiter unit are at approximately the same pressure.

19. The device as claimed in claim 18, wherein
   the annular body of the current limiter unit is arranged with the third yoke limb, and
   the annular body and the third yoke limb are arranged together in their own cryostat.

20. The device as claimed in claim 19, wherein
   there are a plurality of annular bodies, each of which is superconducting, and the magnetic flux body has a plurality of yoke limbs, which are surrounded respectively by the plurality of annular bodies.

21. The device as claimed in claim 20, wherein the at least one annular body is composed of solid high-$T_c$ superconductor material.

22. The device as claimed in claim 20, wherein the at least one body comprises a supporting tube which is coated with the high-$T_c$ superconductor material.

23. The device as claimed in claim 20, wherein the at least one annular body is formed by a short-circuited winding composed of plate elements which are coated with high-$T_c$ superconductor material.

24. The device as claimed in claim 20, wherein the at least one annular body is formed by a short-circuited winding comprising at least one high-$T_c$ superconductor.

25. The device as claimed in claim 24, wherein the conductor of the short-circuited winding contains high-$T_c$ superconductor material which is embedded in an alloy matrix or is applied to a carrier in the form of a strip.

26. The device as claimed in claim 25, wherein the short-circuited winding is formed from two concentric bifilar-connected winding elements, which are arranged respectively on the inside and outside of a hollow-cylindrical yoke limb of a magnetic flux body.

* * * * *